June 10, 1930.   G. H. HUGHES   1,763,155
AIR PUMP
Filed Sept. 7, 1927   3 Sheets-Sheet 1

WITNESSES:

INVENTOR:
George H. Hughes,
BY
ATTORNEY.

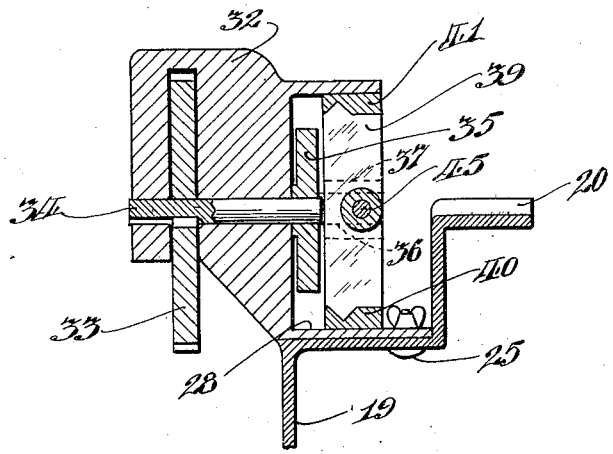
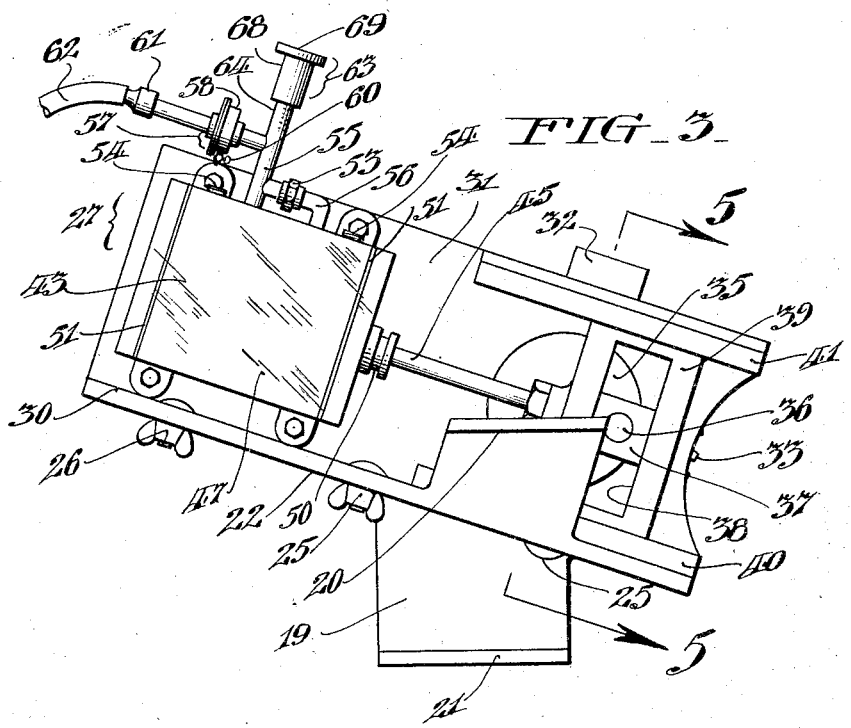

June 10, 1930.  G. H. HUGHES  1,763,155
AIR PUMP
Filed Sept. 7, 1927   3 Sheets-Sheet 3
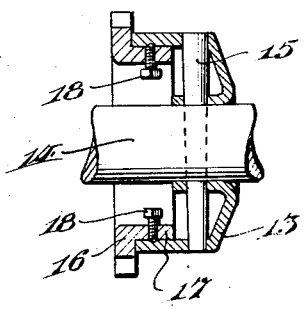
FIG-6
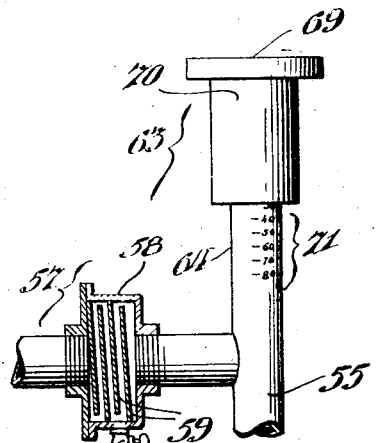
FIG-7
FIG-4
WITNESSES:
INVENTOR:
George H. Hughes,
BY
ATTORNEY.

Patented June 10, 1930

1,763,155

UNITED STATES PATENT OFFICE

GEORGE H. HUGHES, OF PHILADELPHIA, PENNSYLVANIA

AIR PUMP

Application filed September 7, 1927. Serial No. 217,892.

My invention relates to air pumps and has for its object to provide a device of this character which may be mounted on a motor vehicle and driven by the engine thereof.

Motor vehicles in use at the present time do not readily lend themselves to the addition of air pumps and another object of my invention is to provide a pump which may be attached to a motor vehicle without any alteration thereto and which, when installed, does not obstruct access to the working parts of the engine.

A further object is to mechanically connect the pump with the engine in such a manner that the pump will be positively driven, when desired, and may be disconnected from the engine when not in use.

A still further object is to provide a pump mounting which may be employed in connection with any one of a plurality of mounting brackets which are adapted for use on various makes of motor vehicles.

A still further object is to provide the pump with an automatic relief valve whereby air may be pumped into a tire or other container up to a predetermined pressure only.

A further object is to provide a pumping mechanism which may be readily moved to and from driven connection with the mechanism of the motor and which is provided with novel means whereby such driven connection may be made with said motor.

The above objects are accomplished by providing a bracket attachable to a motor with a carriage having pump mechanism mounted thereon slidably connected with said bracket, said carriage having operating means for the pump carried thereon and means thereon for connecting the same with the moving part of the motor. Where the pumping mechanism is in the nature of a cylinder having a piston reciprocable therein, this connection may take the form of a crank head eccentrically connected to a wheel which in turn is secured to a shaft having a gear thereon adapted to be brought into mesh with a pinion on the crank shaft of the motor.

Figure 3 is a rear view of the pump shown in Figure 1.

Figure 2:
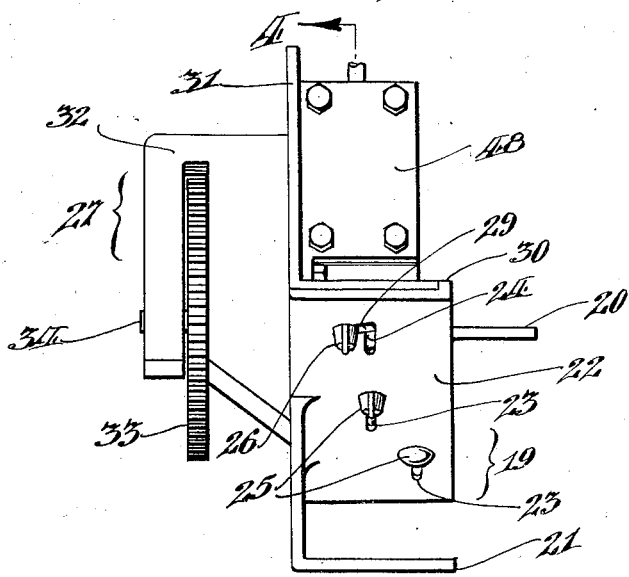
Figure 2 is an end view of the pump shown in Figure 1 looking from the right hand end of the pump, but having the outlet pipe broken away.

Figure 4 a central longitudinal sectional view therethrough, as indicated by line 4—4 on Figure 2, and Figure 5 a cross-sectional view taken on line 5—5 on Figure 3.

Figure 1:
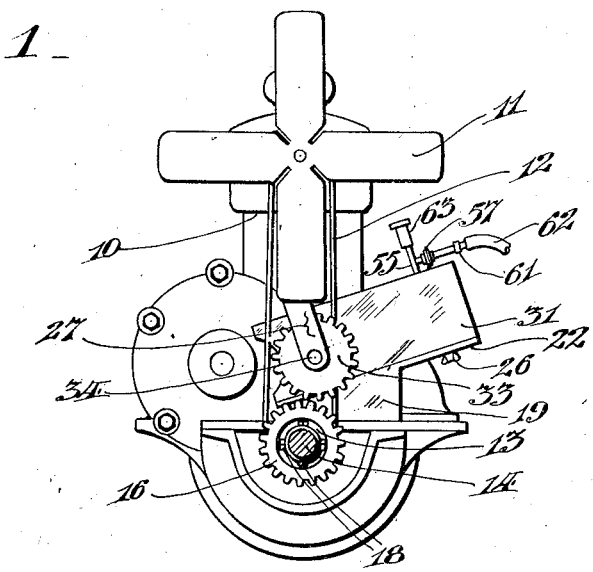
Figure 1 is a front view of an automobile engine on which one of my improved air pumps has been installed.

Figure 6 is a central cross-sectional view through the fan belt pulley and pinion shown in Figure 1, and Figure 7 an enlarged fragmentary view, partly in section, of a pressure regulating means and an oil trap forming parts of my invention.

Referring now in more detail to the drawings, my invention has been shown in Figure 1 as being applied to a certain type of engie 10 which is provided with a regulation fan 11 driven by a fan belt 12 which encircles the fan pulley (not shown) and the fan driving pulley 13 fixed to the crank shaft 14 of the engine by a tapered pin 15. In the type of engine shown, pulley 13 is cup-shaped with its open end facing forward.

In order to provide positive drive for my improved air pump on this type of engine, I provide a pinion 16 whose pitch diameter is but slightly greater than the outside diameter of pulley 13 and whose hub 17 is slightly smaller than the inside diameter of pulley 13 so that it may telescope therein and be centered and held in position by a plurality of set screws 18 which are threaded through hub 17 and contact with the inner surface of pulley 13. While other means may be employed for mounting a pinion so that it will be rotated by the crank shaft, I find that the above mentioned method has the advantages of allowing it to be properly centered and of being cheap and requiring no alteration to the vehicle.

As the engines in various makes of cars differ, it is evident that a different mounting bracket will be required for each make of vehicle. In the drawings, I have shown my pump mounted on a bracket 19 which is provided with an upper flange 20 and a lower flange 21 having suitable holes therethrough (not shown) which are adapted to receive the two bolts immediately behind the timing gear case and the two bolts immediately behind pulley 13, respectively, by means of which the bracket is securely bolted to the engine without any alteration thereto. The pump supporting portion or shaft 22, which is inclined to the horizontal as shown in Figure 1, is provided with longitudinal slots 23 and an L-shaped slot 24 which are adapted to receive bolts 25 and 26, respectively; the legs of slot 24 being disposed at a slightly acute angle relative to one another.

A pump mounting in the nature of a carriage 27 is supported by bracket 19 and held in adjusted positions thereon by bolts 25, which extend through suitable holes in its bottom 28, and by bolt 26, which extends through a transverse slot 29 adapted to register with the transversely disposed leg of L-shaped slot 24 in shelf 22 when the pump mounting is in fully retracted position, while its one end aligns with the longitudinally disposed leg of L-shaped slot 24 at all times. Pump mounting 27 is further held against transverse movement by one edge of its bottom 28 abutting a shoulder 30 formed on the inner edge of shelf 22.

A web 31 extends upwardly from one edge of bottom 28 and has a bracket bearing 32 formed on its side face in which a gear 33 fixed on a shaft 34 is rotatably mounted and adapted to be brought into mesh with pinion 16 by means of the adjustment of the bottom 28 on the shelf 22 through the bolts 25 connected thereto to the slots 23 when the pump is in operative position. A wheel 35, fixed on the inner end of shaft 34, carries a pin 36 near its periphery which is rotatably mounted in a block 37 slidably mounted in a slot 38 formed in a cross-head 39 slidably mounted in a pair of guides 40 and 41 fixed to bottom 28 and a top flange 42, respectively; top flange 42 being secured to or formed on the upper edge of web 31.

A cylinder 43 is secured to web 31 and provided with a piston 44 which is connected to cross-head 39 by a piston rod 45 so that, when gear 33 is rotated by pinion 16, piston 44 will be reciprocated in cylinder 43 and cause air to be compressed in the well known manner; piston 44 may be in any form but has been shown as being provided with a plurality of piston rings 46.

Cylinder 43 consists of a main casting 47 having its ends closed by cylinder heads 48 and 49 and leakage of air therefrom is prevented by a gland 50 in cylinder head 49, through which piston rod 45 extends, and by gaskets 51 which are disposed between main casting 47 and the cylinder heads. Each cylinder head is provided with an air duct 52 which communicates with a passage 53 extending inwardly from each end of casting 47. Intake check valves 54 are mounted in casting 47, near each of its ends, and communicate with passages 53. An outlet pipe 55 communicates with one passage 53 and a branch 56, connected to outlet pipe 55, communicates with the other passage 53; both outlet pipe 55 and branch 56 being provided with suitable check valves, as plainly shown in Figure 4.

In order that oil, used in lubricating piston 44, may not reach the tire or other container, I preferably provide an oil trap 57 in outlet pipe 55. This trap consists of a casing 58 having a plurality of baffles 59 secured alternately to opposite sides of casing 58 so as to provide a circuitous path for the air and relatively extensive surfaces against which the compressed air is blown for the purpose of extracting the oil therefrom; the oil being removed from oil trap 57 in any desired manner, as by means of a pet cock 60. The outer end of outlet pipe 55 is preferably provided with a hose connection 61 to which an air hose 62 may be attached.

In order that tires may be inflated to a predetermined pressure, I provide an automatic relief valve 63 which is formed on an extension of outlet pipe 55 and which consists of a casing 64 containing a ball check 65 disposed adjacent the path of the compressed air and held in closed position by spring 66; the tension of which is regulated by a screw 67 threaded through a cap 68. A thumb wheel 69, having a depending flange 70, is fixed to the upper end of screw 67 and its lower edge adapted to align with the various markings of a scale 71 marked on the outside of casing 64.

When it is desired to inflate the tires of a motor vehicle to any specified pressure, thumb wheel 69 is turned until the lower edge of flange 70 aligns with the numeral representing the desired pressure. The nuts on bolts 25 and 26 are then loosened, bolt 26 moved in slot 29 until it aligns with the longitudinal leg of slot 24, and pump mounting 27 slid along shelf 22 until gear 33 meshes properly with pinion 16. A suitable stop may be provided for limiting the forward movement of pump mounting 27 so that the gears mesh properly or slots 22 may be of the proper length to provide this limitation.

The engine being started, piston 44 will be reciprocated in cylinder 43, as above described, and will force air through outlet pipe 55 and draw air in through one of the intake valves 54 during one half of each revolution of wheel 35 and will force air outwardly through branch 56 and draw air in through the other intake valve 54 during the other half revolution of wheel 35.

When the air in the tire or other container has attained the pressure at which relief valve 63 is set, the air pressure in outlet pipe 55 will raise ball check 65 against the action of spring 66 and allow the air to escape through a suitable aperture in cap 68; thus avoiding the necessity of watching the pressure in the tire as it is being inflated or of removing the hose from the valve stem to check such pressure as the hiss of the escaping air readily informs the operator when the tire is properly inflated. As the compressed air flows through outlet pipe 55, it comes directly in contact with baffles 59 and any oil carried by it will be deposited upon these baffles and will run into the lower part of casing 58, from whence it may be occasionally drained through pet cock 60.

Each make of vehicle may require a different bracket 19 but the pump and mounting is the same for all vehicles and a pump may be transferred from the bracket on one vehicle to a bracket on another vehicle. Bracket bearing 32 is relatively narrow so that it may extend through the fan belt. In this manner, pinion 16 is disposed between the engine and the radiator, which is the only available space on some makes of vehicles, and sufficient clearance is provided between bearing 32 and the fan belt to allow gear 33 to be brought into and out of mesh with pinion 16.

The mechanism constituting the invention as hereinbefore illustrated and described may be changed and modified in various ways within the scope of the invention as hereinafter claimed.

I claim:—

1. An air pumping attachment for vehicle motors including a pinion attachable to the crankshaft pulley of a motor, a bracket secured to the motor, a pump mounting slidable on the bracket, a cylinder on the mounting, a piston reciprocable in the cylinder, and a gear operably connected to the piston to be brought into mesh with the pinion.

2. An air pumping attachment for vehicle motors including a pinion fixed on the crankshaft pulley of a motor, a bracket mounted on the motor, an air pump slidable on the bracket, a gear connected to the pump to mesh with the pinion, and means for holding the gear into or out of engagement with the pinion.

3. An air pumping attachment for vehicle motors including a pinion having a hub extending into the crankshaft pulley of a motor, means for securing the pinion therein, a bracket mounted on the motor, an air pump slidable on the bracket, a gear connected to the pump to mesh with the pinion, and means for holding the gear into or out of engagement with the pinion.

4. In an air pump of the character described, in combination, a cylinder including a body part having an air passage extending inwardly from each of its ends and a piston receiving bore, a cylinder head on each end of the body part having an air duct communicating with the bore and with an air passage, and an intake and an exhaust valve communicating with each passage.

5. An air pump for motor vehicles including, in combination, a bracket attachable to the motor of the vehicle, a pump mounting slidably mounted on the bracket, a cylinder secured to the mounting, a piston in the cylinder, guides on the mounting, a cross-head slidable in the guides, a piston rod connecting the piston and cross-head, a shaft rotatable in the mounting, a wheel on the shaft, a block eccentrically mounted on the wheel and slidable in the cross-head, and means for rotating the shaft.

6. An air pump for motor vehicles including, in combination, a bracket attachable to the motor of the vehicle, a pump mounting slidably mounted on the bracket, a cylinder secured to the mounting, a piston in the cylinder, an outlet pipe leading from the cylinder, a relief valve communicating with the outlet pipe, guides on the mounting, a cross-head slidable in the guides, a piston rod connecting the piston and cross-head, a shaft rotatable in the mounting, a wheel on the shaft, a block eccentrically mounted on the wheel and slidable in the cross-head, and means for rotating the shaft.

7. An air pump for motor vehicles including, in combination, a bracket attachable to the motor of the vehicle, a pump mounting adjustably mounted on the bracket, a cylinder secured to the mounting, a piston in the cylinder, guides on the mounting, a cross-head slidable in the guides, a piston rod connecting the piston and cross-head, a bifurcated bearing on the mounting, a shaft rotatable in the bearing, a wheel on the shaft, a block eccentrically mounted on the wheel and slidable in the cross-head, a pinion rotatable by the motor, and a gear on the shaft to mesh with the pinion and rotatable in the bearing, and means for rotating the shaft.

8. An attachment for vehicle motors including, in combination, a bracket, a carriage with an air pump mechanism mounted thereon, said carriage being slidably mounted on said bracket, a pinion detachably connected to the crank shaft of the motor and means for operating said pump including a gear operably connected to the carriage and so positioned relative thereto as to be brought into mesh with said pinion when the carriage is moved to one position and a shaft journaled to said carriage to one end of which said gear is secured, the opposite end of said shaft being operably connected to said pump.

9. An air pump for attachment with a vehicle motor having a crank shaft extending therebeyond and comprising, in combination, a pinion connected to said shaft, a bracket for attachment to the motor, pumping mechanism slidably connected to the bracket having a driving gear associated therewith and so positioned thereon as to be brought into mesh with said pinion when the pump mechanism is slid to one position on the bracket and means on said pump mechanism for securing it in positions of adjustment.

10. An air pump for driven attachment to a vehicle motor and including, in combination, a pinion attachable to the crank shaft of the motor, a bracket attachable to the motor casing, a carriage slidably mounted on the bracket and a pump secured to the carriage, said pump including a piston cylinder and a piston slidable therein, guideways on said bracket, a crank head slidable in the guideways and connected to said piston, a shaft journaled on the carriage, a wheel on said shaft having eccentric connection with the crank head and a gear on said shaft positioned so as to be meshed with said pinion in one position of said carriage.

11. An air pump for driven attachment to a vehicle motor and including, in combination, a pinion attachable to the crank shaft of the motor, a bracket attachable to the motor casing, a carriage slidably mounted on the bracket and a pump secured to the carriage and means for operating the pump from the crank shaft of the motor including a shaft journaled on the carriage, a gear at one end of the shaft to be brought into mesh with said pinion, and mechanism on the other end of the shaft for operating the pump.

12. An air pump attachment for vehicle motors, including a pinion detachably connected to the crank shaft of a motor, a bracket detachably connected to the motor, a pump mounted on the bracket and a gear operably connected to the pump, said pump being slidably adjustable on the bracket for moving the said gear into mesh with said pinion, and valves controlling the inflow and output of air to the pump.

In testimony whereof I have signed my name to this specification.

GEORGE H. HUGHES.